United States Patent
Lu et al.

(10) Patent No.: US 12,428,528 B2
(45) Date of Patent: Sep. 30, 2025

(54) REINFORCED POLYPROPYLENE MATERIAL AND PREPARATION METHOD THEREOF

(71) Applicant: KINGFA SCI. & TECH. CO., LTD., Guangdong (CN)

(72) Inventors: Zhanquan Lu, Guangdong (CN); Xianbo Huang, Guangdong (CN); Nanbiao Ye, Guangdong (CN); Shuwen Cheng, Guangdong (CN); Annan Guan, Guangdong (CN); Lewen Liu, Guangdong (CN); Xiaoyun Yang, Guangdong (CN)

(73) Assignee: KINGFA SCI. & TECH. CO., LTD., Guangdong (CN)

( * ) Notice: Subject to any disclaimer, the term of this patent is extended or adjusted under 35 U.S.C. 154(b) by 226 days.

(21) Appl. No.: 17/916,800

(22) PCT Filed: Nov. 19, 2020

(86) PCT No.: PCT/CN2020/130134
§ 371 (c)(1),
(2) Date: Oct. 4, 2022

(87) PCT Pub. No.: WO2021/212820
PCT Pub. Date: Oct. 28, 2021

(65) Prior Publication Data
US 2023/0159712 A1 May 25, 2023

(30) Foreign Application Priority Data
Apr. 20, 2020 (CN) .......................... 202010311842.4

(51) Int. Cl.
| | | |
|---|---|---|
| *C08J 5/04* | (2006.01) | |
| *B29C 48/00* | (2019.01) | |
| *B29C 48/02* | (2019.01) | |
| *B29C 48/04* | (2019.01) | |
| *B29C 48/40* | (2019.01) | |
| *C08K 3/22* | (2006.01) | |
| *C08K 7/10* | (2006.01) | |
| *C08K 7/14* | (2006.01) | |
| *B29K 23/00* | (2006.01) | |
| *B29K 105/12* | (2006.01) | |

(52) U.S. Cl.
CPC ............. *C08J 5/043* (2013.01); *B29C 48/022* (2019.02); *B29C 48/04* (2019.02); *B29C 48/40* (2019.02); *C08K 3/2279* (2013.01); *C08K 7/10* (2013.01); *C08K 7/14* (2013.01); *B29K 2023/12* (2013.01); *B29K 2105/12* (2013.01); *C08J 2323/12* (2013.01); *C08K 2003/2241* (2013.01); *C08K 2003/2296* (2013.01)

(58) Field of Classification Search
CPC ..... C08J 5/043; C08J 2323/12; B29C 48/022; B29C 48/04; B29C 48/40; C08K 3/2279; C08K 7/10; C08K 7/14; C08K 2003/2241; C08K 2003/2296; B29K 2023/12; B29K 2105/12
USPC ........................................................ 524/494
See application file for complete search history.

(56) References Cited

U.S. PATENT DOCUMENTS

2018/0186999 A1    7/2018   Park et al.

FOREIGN PATENT DOCUMENTS

| CN | 102504405 | | 6/2012 | |
| CN | 105385030 B | * | 11/2017 | ............. C03C 25/40 |
| CN | 109824985 A | * | 5/2019 | |
| CN | 111534037 | | 8/2020 | |

OTHER PUBLICATIONS

"International Search Report (Form PCT/ISA/210) of PCT/CN2020/130134", mailed on Jan. 20, 2021, with English translation thereof, pp. 1-4.

* cited by examiner

*Primary Examiner* — Marc S Zimmer
*Assistant Examiner* — Ronald Grinsted
(74) *Attorney, Agent, or Firm* — JCIPRNET

(57) ABSTRACT

Disclosed is a reinforced polypropylene material, comprising in parts by weight: a, 10-90 parts of polypropylene resin, b, 0.5-25 parts of compatilizer, c, 5-60 parts of reinforced fibers and d, 0.1-20 parts of low-hardness toner. The reinforced fibers comprise a component I, a component II and a component III, where the component I is composed of reinforced fibers with a length of 0.1-0.6 mm and accounts for 35-50% of number of reinforced fibers, the component II is composed of reinforced fibers with a length of 0.7-1.3 mm and accounts for 35-45% of number of reinforced fibers, and component III is composed of reinforced fibers with a length of 1.4-2.0 mm and accounts for 5-20% of number of reinforced fibers. The present invention, by adjusting the length and the content distribution of the reinforced fibers in the reinforced polypropylene material formula, greatly preserves the maintained length of the reinforced fibers in the reinforced polypropylene material, and by combining a specific amount of low hardness toner and a specific amount of compatilizer, the low-temperature resilience and the long-term weatherability performance of the resulting reinforced polypropylene material are significantly improved.

20 Claims, No Drawings

REINFORCED POLYPROPYLENE MATERIAL AND PREPARATION METHOD THEREOF

CROSS-REFERENCE TO RELATED APPLICATION

This application is a 371 of international application of PCT application serial no. PCT/CN2020/130134, filed on Nov. 19, 2020, which claims the priority benefit of China application no. 202010311842.4, filed on Apr. 20, 2020. The entirety of each of the above mentioned patent applications is hereby incorporated by reference herein and made a part of this specification.

TECHNICAL FIELD

The present invention relates to the technical field of engineering plastics, and specifically to a reinforced polypropylene material and a preparation method thereof.

RELATED ART

As a polymer material with the largest consumption at present, polypropylene materials have advantages such as excellent processing properties and mechanical properties, which are widely used in daily life and industrial production fields, such as agricultural film, wire and cable, communication, housing construction and aviation manufacturing.

Glass fibers are generally used as a reinforcing medium in conventional reinforced polypropylene materials, and high strength and high rigidity of the glass fibers make the product have improved strength and heat resistance. However, conventional glass fiber-reinforced polypropylene materials have defects of poor light-aging resistance and thermal-aging resistance, and poor low-temperature tenacity, which cannot be used in long-term severe environment.

It is surprisingly found through a lot of experiments by the inventors that by adjusting the length and content distribution of reinforcing fibers in the formulas of reinforced polypropylene material, greatly retaining the length of reinforcing fibers in the reinforced polypropylene material, and by combining a specific amount of low-hardness colorant powder and supplementing with a specific amount of compatilizer, the obtained reinforced polypropylene material would have obviously improved low-temperature tenacity and long-term weathering resistance without adding a toughening agent or a conventional weather-resistant agent, so as to meet the requirement of long-term application of materials.

SUMMARY OF INVENTION

In order to overcome the defects and deficiencies of the prior art, the objective of the present invention is to provide a reinforced polypropylene material with significantly improved low-temperature tenacity and long-term weathering resistance.

Another objective of the present invention is to provide a preparation method for the above-mentioned reinforced polypropylene material.

The present invention is realized by the following technical solutions.

A reinforced polypropylene material includes the following components in parts by weight:
a, 10 to 90 parts of a polypropylene resin;
b, 0.5 to 25 parts of a compatilizer;
c, 5 to 60 parts of reinforcing fibers;
d, 0.1 to 20 parts of low-hardness colorant powder;
the reinforcing fibers include a component I, a component II and a component III:
the component I is composed of reinforcing fibers with a length of 0.1 mm to 0.6 mm, accounting for 35% to 50% of a number of reinforcing fibers;
the component II is composed of reinforcing fibers with a length of 0.7 mm to 1.3 mm, accounting for 35% to 45% of the number of reinforcing fibers;
the component III is composed of reinforcing fibers with a length of 1.4 mm to 2.0 mm, accounting for 5% to 20% of the number of reinforcing fibers.

The reinforcement effect of the reinforcing fibers is related to the dispersion condition, distribution uniformity and orientation of the reinforcing fibers in the matrix resin, and to the interface condition of the matrix resin. Generally, the greater the length of the glass fibers is retained, the better the mechanical performance and heat resistance are achieved. When the length of the reinforcing fibers and the retained length of the glass fibers are too short, rigidity and heat resistance of the material would be greatly weakened. When the length of the reinforcing fibers is too long, the plastic particles become too long, which would affect the feeding during the processing.

Specifically, the component I in the reinforcing fibers accounts for 38% to 45% of the number of reinforcing fibers.

Specifically, the component II in the reinforcing fibers accounts for 37% to 42% of the number of reinforcing fibers.

Specifically, the component III in the reinforcing fibers accounts for 8% to 15% of the number of reinforcing fibers.

Specifically, the reinforcing fibers are selected from one or more of glass fibers, quartz fibers, and basalt fibers; the reinforcing fibers have a diameter of 5 to 20 microns.

Specifically, the low-hardness colorant powder has a Moh's hardness less than 6; and preferably a Moh's hardness of 0.1-4.

Specifically, the low-hardness colorant powder is selected from one or more of zinc white, zinc sulfide, barium white, antimony white, lithopone, lead white, calcium carbonate, talc powder, kaolin, barium sulfate, and titanium dioxide.

Specifically, the polypropylene resin is selected from one or more of homo-polypropylene (PP-H), block copolymerized polypropylene (PP-B) and random copolymerized polypropylene (PP-R).

Specifically, the compatilizer is a graft polymer of polar monomer and polypropylene, wherein the polar monomer is selected from one or a mixture of derivatives of maleic anhydrides, acrylic acids and acrylates.

The present invention further provides a preparation method for the above-mentioned reinforced polypropylene material which includes the following steps.

Each component is weighed according to the formula contents, and all components except for the reinforcing fibers are mixed uniformly to form a mixture. Subsequently, the mixture is added to a primary feeding system of a double-screw extruder; meanwhile the reinforcing fibers are added to a side feeding system of the double-screw extruder, and then the reinforced polypropylene material is obtained after melt-blending, extruding and pelleting by the double-screw extruder.

Specifically, feeding position of the side feeding system of the double-screw extruder can be adjusted, wherein the reinforcing fibers can be added to the screw at the first section to the tenth section, and added after the die head of the extruder, followed by directly combining with a polypropylene melt.

Specifically, temperature of the first section to the second section of the double-screw extruder ranges from 120° C. to 160° C., temperature of the third section to the fifth section ranges from 180° C. to 300° C., temperature of the fifth section to the tenth section ranges from 180° C. to 300° C. A screw speed is 300 rpm to 600 rpm.

Compared with the prior art, the present invention has the following beneficial effects.

By adjusting the length and content distribution of the reinforcing fibers in the formulas of reinforced polypropylene material, greatly retaining the length of reinforcing fibers in the reinforced polypropylene material, and by combining a specific amount of low-hardness colorant powder and supplementing with a specific amount of compatilizer, the obtained reinforced polypropylene material would have obviously improved low-temperature tenacity and long-term weathering resistance without adding a toughening agent or a conventional weather-resistant agent, so as to meet the requirement of long-term application of materials.

DESCRIPTION OF EMBODIMENTS

The present invention would be further illustrated by the specific implementations, and the following embodiments are preferred implementations of the present invention of which the implementation does not limited thereto.
Test Standards or Methods Test methods for length and distribution of reinforcing fibers: a sample strip of notch-impact strength after injection molding was first subjected to high-temperature burning to isolate the reinforcing fibers from a matrix, then length of the reinforcing fibers was measured by using an automatic imaging analysis, and a number of the fibers to be measured was around 2000.

Low-temperature tenacity is: notch impact strengths at normal temperature and at −40° C. were measured at the same time; test standard: ISO 180/1A.

Long-term weathering resistance is: ISO 4892-2, color difference was measured after aging under a xenon lamp for 100 hours.

Polypropylene resin is used in the present invention:
polypropylene resin: block copolymerized polypropylene (PP-B): PP SP179 from Lanzhou Petrochemical Company.

Compatilizer is used in the present invention:
maleic anhydride grafted polypropylene (PP-g-MAH): 1001CN from Polyram.

Reinforcing fibers are used in the present invention:
glass fibers: diameter of 10 microns, ER4305PM-2400 from Jushi;
quartz fibers: diameter of 5 microns, quartz fiber untwisted yarn SJ114 from Henan Shenjiu Aerospace New Material Inc.;
basalt fibers: diameter of 15 microns, basalt fiber untwisted yarn from Zhejiang GBF Co., Ltd.

Low-hardness colorant powder are used in the present invention:
zinc white: Moh's hardness of 3.0, from Cangzhou Jieweixinye Co., Ltd.;
antimony white: Moh's hardness of 3.5, from Changde Chenzhou Antimony Article Co., Ltd.;
titanium dioxide-1: Moh's hardness of 5.0, BX-200 from Hebei Langfang Qicai Titanium White Powder Manufacturing Co., Ltd.;
titanium dioxide-2: Moh's hardness of 7.5, BX-237 from Hebei Langfang Qicai Titanium White Powder Manufacturing Co., Ltd.

Toughening agent: POE DF610 is from Singapore Mitsui Chemicals Co., Ltd.

Weather-resistant agent: UV-531 is from Hubei MFCI Co., Ltd.

Examples 1-8 and Comparative Examples 1-6:
Preparation for Reinforced Polypropylene Materials Each component was weighed according to the formula contents, and all components except for the reinforcing fibers were mixed uniformly to form a mixture. Subsequently, the mixture was added to a primary feeding system of a double-screw extruder; meanwhile the reinforcing fibers were added to a side feeding system of the double-screw extruder, and then the reinforced polypropylene material was obtained after melt-blending, extruding and pelleting by the double-screw extruder.

Specifically, feeding position of the side feeding system of the extruder could be adjusted, wherein the reinforcing fibers could be added to the screw at the first section to the tenth section, and added after the die head of the extruder, followed by directly combining with a polypropylene melt.

Specifically, temperature of the first section to the second section of the extruder ranges from 120° C. to 160° C., temperature of the third section to the fifth section ranges from 180° C. to 300° C., temperature of the fifth section to the tenth section ranges from 180° C. to 300° C., and a screw speed is 300 rpm to 600 rpm.

Table 1 is specific proportion (parts by weight) of each component in each example and comparative example and performance test results thereof.

|  |  | Example 1 | Example 2 | Example 3 | Example 4 | Example 5 | Example 6 | Example 7 | Example 8 |
|---|---|---|---|---|---|---|---|---|---|
| Polypropylene resin | PP SP179 | 60 | 60 | 60 | 60 | 10 | 10 | 60 | 60 |
| Compatilizer | PP-g-MAH | 3 | 3 | 3 | 3 | 25 | 25 | 3 | 3 |
| Reinforcing fibers | Glass fibers | 30 | 30 | 30 | 30 |  |  | 30 | 30 |
|  | Quartz fibers |  |  |  |  | 20 |  |  |  |
|  | Basalt fibers |  |  |  |  |  | 40 |  |  |
| Toughening agent | POE |  |  |  |  |  |  |  |  |
| Weather-resistant agent | UV-531 |  |  |  |  |  |  |  |  |
| Low-hardness colorant powder | Zinc white | 0.2 |  |  |  |  |  |  |  |
|  | Antimony white |  |  |  | 0.2 | 20 | 5 | 0.2 | 0.2 |
|  | Titanium dioxide-1 |  | 0.2 |  |  |  |  |  |  |

-continued

| | | | | | | | | | |
|---|---|---|---|---|---|---|---|---|---|
| | Titanium dioxide-2 | | | 0.2 | | | | | |
| Dosage of the reinforcing fibers added to the first section (part) | | | | | | | | | |
| Dosage of the reinforcing fibers added to the second section (part) | | | | | | | | | |
| Dosage of the reinforcing fibers added to the third section (part) | | | | | | | | | 5 |
| Dosage of the reinforcing fibers added to the fourth section (part) | | | | | | | | 15 | |
| Dosage of the reinforcing fibers added to the fifth section (part) | | 5 | 5 | 5 | 5 | 5 | 5 | | |
| Dosage of the reinforcing fibers added to the sixth section (part) | | | | | | | | | |
| Dosage of the reinforcing fibers added to the seventh section (part) | | | | | | | | 10 | |
| Dosage of the reinforcing fibers added to the eighth section (part) | | 5 | 5 | 5 | 5 | 5 | 15 | | |
| Dosage of the reinforcing fibers added to the ninth section (part) | | | | | | | | | |
| Dosage of the reinforcing fibers added to the tenth section (part) | | | | | | | | | |
| Dosage of the reinforcing fibers added to the die head (part) | | 20 | 20 | 20 | 20 | 10 | 20 | 5 | 25 |
| Percentage of Component I accounting for the number of reinforcing fibers (%) | | 45 | 38 | 38 | 43 | 40 | 39 | 50 | 35 |
| Percentage of Component II accounting for the number of reinforcing fibers (%) | | 40 | 42 | 40 | 42 | 38 | 40 | 35 | 45 |
| Percentage of Component III accounting for the number of reinforcing fibers (%) | | 15 | 13 | 8 | 15 | 12 | 14 | 5 | 20 |
| Notch impact strength at normal temperature (KJ/M$^2$) | | 44 | 28 | 29 | 47 | 40 | 39 | 34 | 33 |
| Notch impact strength at −40° C. (KJ/M$^2$) | | 41 | 25 | 27 | 44 | 38 | 37 | 31 | 30 |
| Color difference measured after aging under a xenon lamp for 100 hours | | 1.1 | 2.6 | 2.7 | 1.2 | 1.7 | 1.6 | 2.1 | 2.2 |

| | | Comparative Example 1 | Comparative Example 2 | Comparative Example 3 | Comparative Example 4 | Comparative Example 5 | Comparative Example 6 |
|---|---|---|---|---|---|---|---|
| Polypropylene resin | PP SP179 | 60 | 60 | 60 | 60 | 60 | 60 |
| Compatilizer | PP-g-MAH | 3 | 3 | 3 | 0 | 0.2 | 32 |
| Reinforcing fibers | Glass fibers | 30 | 30 | 30 | 30 | 30 | 30 |
| | Quartz fibers | | | | | | |
| | Basalt fibers | | | | | | |
| Toughening agent | POE | | 10 | | | | |
| Weather-resistant agent | UV-531 | | 0.2 | | | | |
| Low-hardness colorant powder | Zinc white | | | | | | |
| | Antimony white | 0 | | 28 | 0.2 | 0.2 | 0.2 |
| | Titanium dioxide-1 | | | | | | |
| | Titanium dioxide-2 | | | | | | |
| Dosage of the reinforcing fibers added to the first section (part) | | | | | | | |
| Dosage of the reinforcing fibers added to the second section (part) | | | | | | | |

-continued

| | | | | | | |
|---|---|---|---|---|---|---|
| Dosage of the reinforcing fibers added to the third section (part) | 5 | | | | 15 | |
| Dosage of the reinforcing fibers added to the fourth section (part) | | 15 | | | | |
| Dosage of the reinforcing fibers added to the fifth section (part) | 15 | 30 | | | 10 | |
| Dosage of the reinforcing fibers added to the sixth section (part) | | 10 | | | | |
| Dosage of the reinforcing fibers added to the seventh section (part) | | | | | | |
| Dosage of the reinforcing fibers added to the eighth section (part) | 10 | 5 | | | 20 | 15 |
| Dosage of the reinforcing fibers added to the ninth section (part) | | | 15 | | | |
| Dosage of the reinforcing fibers added to the tenth section (part) | | | | | | |
| Dosage of the reinforcing fibers added to the die head (part) | 5 | 10 | | | | |
| Percentage of Component I accounting for the number of reinforcing fibers (%) | 60 | 87 | 20 | 78 | 85 | 75 |
| Percentage of Component II accounting for the number of reinforcing fibers (%) | 24 | 5 | 55 | 4 | 4 | 15 |
| Percentage of Component III accounting for the number of reinforcing fibers (%) | 3 | 8 | 25 | 2 | 11 | 3 |
| Notch impact strength at normal temperature (KJ/M$^2$) | 12 | 18 | 10 | 8 | 8.5 | 9.2 |
| Notch impact strength at −40° C. (KJ/M$^2$) | 4 | 8 | 3 | 2.5 | 2.8 | 4.2 |
| Color difference measured after aging under a xenon lamp for 100 hours | 5 | 2.0 | 4 | 2.2 | 2.3 | 5.0 |

What is claimed is:

1. A reinforced polypropylene material, wherein the material comprises the following components in parts by weight:
   a, 10 to 90 parts of a polypropylene resin;
   b, 0.5 to 25 parts of a compatibilizer;
   c, 5 to 60 parts of reinforcing fibers;
   d, 0.1 to 20 parts of low-hardness colorant powder;
   wherein the reinforcing fibers comprise a component I, a component II and a component III:
   the component I is composed of reinforcing fibers with a length of 0.1 mm to 0.6 mm, accounting for 35% to 50% of the number of reinforcing fibers;
   the component II is composed of reinforcing fibers with a length of 0.7 mm to 1.3 mm, accounting for 35% to 45% of the number of reinforcing fibers; and
   the component III is composed of reinforcing fibers with a length of 1.4 mm to 2.0 mm, accounting for 5% to 20% of the number of reinforcing fibers,
   wherein the low-hardness colorant powder has a Moh's hardness less than 6.

2. The reinforced polypropylene material according to claim 1, wherein the component I in the reinforcing fibers accounts for 38% to 45% of the number of reinforcing fibers.

3. The reinforced polypropylene material according to claim 1, wherein the component II in the reinforcing fibers accounts for 37% to 42% of the number of reinforcing fibers.

4. The reinforced polypropylene material according to claim 1, wherein the component III in the reinforcing fibers accounts for 8% to 15% of the number of reinforcing fibers.

5. The reinforced polypropylene material according to claim 1, wherein the reinforcing fibers are selected from the group consisting of one or more of glass fibers, quartz fibers, and basalt fibers; the reinforcing fibers have a diameter of 5 to 20 microns.

6. The reinforced polypropylene material according to claim 1, wherein the low-hardness colorant powder has the Moh's hardness of 0.1 to 4.

7. The reinforced polypropylene material according to claim 1, wherein the low-hardness colorant powder is selected from the group consisting of one or more of zinc white, zinc sulfide, barium white, antimony white, lithopone, lead white, calcium carbonate, talc powder, kaolin, barium sulfate, and titanium dioxide.

8. The reinforced polypropylene material according to claim 1, wherein the polypropylene resin is selected from the group consisting of one or more of homo-polypropylene (PP-H), block copolymerized polypropylene (PP-B) and random copolymerized polypropylene (PP-R).

9. The reinforced polypropylene material according to claim 1, wherein the compatibilizer is a graft polymer of polar monomer and polypropylene, wherein the polar monomer is selected from the group consisting of one or a mixture of derivatives of maleic anhydrides, acrylic acids and acrylates.

10. A preparation method for the reinforced polypropylene material according to claim 1, wherein the method comprises the following steps:

weighing each component according to the formula contents, and uniformly mixing all components except for the reinforcing fibers to form a mixture, then adding the mixture to a primary feeding system of a double-screw extruder; meanwhile adding the reinforcing fibers to a side feeding system of the double-screw extruder, and then melt-blending, extruding and pelleting by the double-screw extruder to obtain the reinforced polypropylene material.

11. The preparation method for the reinforced polypropylene material according to claim 10, wherein feeding position of the side feeding system of the double-screw extruder can be adjusted, wherein the reinforcing fibers can be added to the screw at the first section to the tenth section, and added after the die head of the extruder, followed by directly combining with a polypropylene melt.

12. The preparation method for the reinforced polypropylene material according to claim 10, wherein temperature of the first section to the second section of the double-screw extruder ranges from 120° C. to 160° C., temperature of the third section to the fifth section ranges from 180° C. to 300° C., temperature of the fifth section to the tenth section ranges from 180° C. to 300° C., and a screw speed is 300 rpm to 600 rpm.

13. A preparation method for the reinforced polypropylene material according to claim 2, wherein the method comprises the following steps:
weighing each component according to the formula contents, and uniformly mixing all components except for the reinforcing fibers to form a mixture, then adding the mixture to a primary feeding system of a double-screw extruder; meanwhile adding the reinforcing fibers to a side feeding system of the double-screw extruder, and then melt-blending, extruding and pelleting by the double-screw extruder to obtain the reinforced polypropylene material.

14. A preparation method for the reinforced polypropylene material according to claim 3, wherein the method comprises the following steps:
weighing each component according to the formula contents, and uniformly mixing all components except for the reinforcing fibers to form a mixture, then adding the mixture to a primary feeding system of a double-screw extruder; meanwhile adding the reinforcing fibers to a side feeding system of the double-screw extruder, and then melt-blending, extruding and pelleting by the double-screw extruder to obtain the reinforced polypropylene material.

15. A preparation method for the reinforced polypropylene material according to claim 4, wherein the method comprises the following steps:
weighing each component according to the formula contents, and uniformly mixing all components except for the reinforcing fibers to form a mixture, then adding the mixture to a primary feeding system of a double-screw extruder; meanwhile adding the reinforcing fibers to a side feeding system of the double-screw extruder, and then melt-blending, extruding and pelleting by the double-screw extruder to obtain the reinforced polypropylene material.

16. A preparation method for the reinforced polypropylene material according to claim 5, wherein the method comprises the following steps:
weighing each component according to the formula contents, and uniformly mixing all components except for the reinforcing fibers to form a mixture, then adding the mixture to a primary feeding system of a double-screw extruder; meanwhile adding the reinforcing fibers to a side feeding system of the double-screw extruder, and then melt-blending, extruding and pelleting by the double-screw extruder to obtain the reinforced polypropylene material.

17. A preparation method for the reinforced polypropylene material according to claim 6, wherein the method comprises the following steps:
weighing each component according to the formula contents, and uniformly mixing all components except for the reinforcing fibers to form a mixture, then adding the mixture to a primary feeding system of a double-screw extruder; meanwhile adding the reinforcing fibers to a side feeding system of the double-screw extruder, and then melt-blending, extruding and pelleting by the double-screw extruder to obtain the reinforced polypropylene material.

18. A preparation method for the reinforced polypropylene material according to claim 7, wherein the method comprises the following steps:
weighing each component according to the formula contents, and uniformly mixing all components except for the reinforcing fibers to form a mixture, then adding the mixture to a primary feeding system of a double-screw extruder; meanwhile adding the reinforcing fibers to a side feeding system of the double-screw extruder, and then melt-blending, extruding and pelleting by the double-screw extruder to obtain the reinforced polypropylene material.

19. The preparation method for the reinforced polypropylene material according to claim 11, wherein temperature of the first section to the second section of the double-screw extruder ranges from 120° C. to 160° C., temperature of the third section to the fifth section ranges from 180° C. to 300° C., temperature of the fifth section to the tenth section ranges from 180° C. to 300° C., and a screw speed is 300 rpm to 600 rpm.

20. The reinforced polypropylene material according to claim 3, wherein the low-hardness colorant powder is selected from the group consisting of one or more of zinc white, zinc sulfide, barium white, antimony white, lithopone, lead white, calcium carbonate, talc powder, kaolin, barium sulfate, and titanium dioxide.

* * * * *